United States Patent Office 3,071,537
Patented Jan. 1, 1963

3,071,537
CATALYTIC REFORMING OF PETROLEUM HYDROCARBONS
Frederick William Bertram Porter and Peter Thomas White, Sunbury-on-Thames, England, assignors to The British Petroleum Company Limited, London, England, a British joint-stock corporation
No Drawing. Filed May 11, 1959, Ser. No. 812,103
Claims priority, application Great Britain May 20, 1958
5 Claims. (Cl. 208—65)

This invention relates to the catalytic reforming of petroleum hydrocarbons to give products of increased octane number suitable for use in motor gasoline.

In catalytic reforming processes a naphtha fraction is contacted at elevated temperature and pressure and in the presence of hydrogen with a dehydrogenation catalyst to produce a gasoline fraction of increased octane number. Catalysts that are widely used commercially consist essentially of platinum on alumina with or without combined halogen. A catalytic reforming process using a platinum-on-alumina type catalyst will hereinafter be referred to as platinum reforming and the products as platinum reformates.

Platinum reforming is capable of giving products with octane numbers research (clear) of 95 or more but with the normal heavy naphtha feedstocks used, for example naphthas having a boiling range of about 90 to 175° C., the volatility of such products is comparatively low being of the order of 30–35% volume evaporated at 100° C. Although a product of increased volatility may be obtained by processing a lower boiling feedstock, more severe operating conditions are required to reach a given octane level with a consequent reduction in catalyst life.

The principal object of the present invention is to increase the volatility of platinum reformates.

According to the present invention a platinum reformate is fractionated into a higher-boiling fraction and a lower-boiling fraction, the higher-boiling fraction is contacted at elevated temperature with a catalyst comprising nickel on a nickel-alumina base and the treated higher-boiling fraction is re-combined with the lower-boiling fraction to give a product of increased volatility.

The platinum reformate is preferably produced by a platinum reforming process using a heavy naphtha feedstock and operating under conditions such that regeneration of the catalyst in situ is not required (i.e. a catalyst life of at least 40 barrels of feedstock processed per lb. of catalyst).

The term heavy naphtha means a naphtha having an ASTM final boiling point between 150° C. and 200° C. and, preferably, an ASTM initial boiling point within the range 70° C. to 100° C.

The platinum reforming stage is preferably operated to give a reformate having an octane number research (clear) of 90 to 100. Any convenient platinum reforming process may be used and the process conditions will normally fall within the following ranges:

Catalyst _____ 0.1–10% wt. platinum on alumina with or without 0.1–8% wt. of halogen, particularly fluorine and/or chlorine.
Temperature _____ 600–1200° F., preferably 900–1000° F.
Pressure _____ 50–1000 p.s.i., preferably 300–700 p.s.i.
Space velocity _____ 0.5–10 v./v./hr., preferably 1–3 v./v./hr.
Molar hydrogen/hydrocarbon ratio __ 0.5–15, preferably 6–10.

The platinum reformate should be fractionated so that the higher-boiling fraction contains the majority of the alkly benzenes and a convenient cut-point is in the range 80–130° C., particularly 100–120° C. The re-combined blend of the treated heavy fraction and the light fraction should preferably have a volatility of at least 40% vol. recovered at 100° C., more particularly 40 to 60%, and an octane number research (clear) of at least 90.

As stated above, the catalyst for the second stage comprises nickel on a nickel-alumina base. The nickel-alumina base may be prepared by impregnating alumina with a solution of a nickel compound decomposable under heat to nickel oxide, calcining the impregnated alumina at a temperature above 650° C. but below that at which appreciable transition to alpha-alumina occurs, preferably from 700 to 1000° C., and, preferably, extracting the calcined alumina with an inorganic acid. This extraction step may conveniently use an aqueous acid of less than 50% vol. concentration, preferably about 10% vol. concentration, at a temperature of about 100° C. for 15 to 30 minutes. This base is then impregnated with a further solution of a nickel compound decomposable under heat to nickel oxide and is again calcined, preferably at a temperature in the range 350 to 650° C. The catalyst is preferably reduced before use. The preferred quantity of nickel in the catalyst base is 1–50% (more particularly 25–40%) by weight of the base and the preferred quantity of nickel deposited on the base is 1–30% (more particularly 10–20%) by weight of total catalyst. A full description of the preparation of a nickel on a nickel-alumina base catalyst will be found in U.S. Patent No. 2,982,720.

The reaction with nickel on nickel-alumina catalyst is preferably carried out in the presence of added or recycled hydrogen or hydrogen-containing gas at a temperature of from 250 to 500° C. (482–832° F.) and a pressure of from atmospheric to 200 lbs./sq. in. The space velocity may be 0.1 to 1.0 v./v./hr. and the hydrogen/hydrocarbon mol ratio from 0.5:1 to 2.5:1.

The invention is illustrated by the following example.

EXAMPLE

A 90–175° C. ASTM naphtha of Middle East origin was contacted with a catalyst of 0.56% wt. platinum and 0.65% wt. chlorine on eta-alumina, under conditions to give a product having an octane number research (clear) of 99.2. The reforming conditions were 980° F., 450 p.s.i.g., 1.5 v./v./hr., and 10:1 hydrogen/hydrocarbon mol ratio. The product had a volatility of 34.0% vol. evaporated at 100° C. and was obtained in 70.2% wt. yield on the naphtha feedstock. This platinum reformate was then fractionated at 100° C. into light and heavy fractions having the characteristics shown in Table 1 below.

Table 1

| Fraction | Boiling range, ° C. (ASTM Dist.) | Yield on feed to splitter, percent wt. | O.N. Res. (clear) |
|---|---|---|---|
| Light platinum reformate | 40–93 | 31.5 | 74.3 |
| Heavy platinum reformate | 111–204 | 68.5 | 107.8 |

The heavy fraction was then contacted with a catalyst of nickel on nickel-alumina in the presence of added hydrogen, the hydrogen/hydrocarbon mol ratio being 1:1. The treated fraction was then blended back with the light fraction. Process conditions for the treatment with the nickel on nickel-alumina catalyst and inspection data on the blended material are given in Table 2 below:

Table 2

| Hydrogen/ hydro- carbon mol ratio | Pressure, p.s.i.g. | Temp., °F. | Space velocity, v./v./hr. | Blend of treated heavy reformate with light reformate | | |
|---|---|---|---|---|---|---|
| | | | | Yield on naphtha feedstock, percent wt. | O.N. Res. (clear) | Vola- tility, percent vol. evapo- rated at 100° C. |
| 1:1 | 140 | 800 | 0.5 | 63.1 | 97.1 | 45.5 |
| 1:1 | 140 | 800 | 0.25 | 62.5 | 97.1 | 45.8 |

The volatility of the platinum reformate at 100° C. has thus been increased by 11% vol. with only a slight decrease in octane number.

The nickel on nickel-alumina catalyst was prepared as follows:

1600 g. of aluminium isopropoxide were hydrolysed with 3 litres of water. Excess liquor was centrifuged off and the gel was peptised with 48 ml. of glacial acetic acid. The gel was then impregnated with 1200 g. of $Ni(NO_3)_2 6H_2O$ in 200 ml. of water and the impregnated gel was dried at 140° C. and calcined at 900° C. for 2 hours.

60 g. of this nickel-alumina base were extracted by boiling for 1 hour with 110 ml. of 10% vol. $H_2SO_4$, then water washed four times, water extracted for 2 hours using a soxhlet apparatus and dried at 140° C.

The hot extracted catalyst base was impregnated at 110° C. for ½ hour with 75 g. $Ni(NO_3)_2 6H_2O$ dissolved in its own water of crystallisation. Excess liquor was poured off the catalyst calcined at 500° C. for 1½ hours.

We claim:

1. A process for increasing the volatility of platinum reformates produced from naphtha feedstocks having an ASTM initial boiling point within the range 70° C. to 100° C., and having an ASTM final boiling point between 150° C. and 200° C. by a platinum reforming process operating under non-regenerative conditions such that a catalyst life of at least 40 barrels of feedstock processed per lb. of catalyst is obtained and regeneration of the catalyst in situ is not required, comprising fractionating the reformate having an octane number research (clear) of from 90-100 into a higher-boiling fraction containing the majority of the alkyl benzenes of the reformate and a lower-boiling fraction, the cut-point between the higher-boiling and lower-boiling fractions being from 80° to 130° C., contacting the higher-boiling fraction at an elevated temperature of from 250° to 500° C., at a pressure of from atmospheric to 200 lbs. p.s.i., at a space velocity of from 0.1 to 10 v./v./hr., and in the presence of added hydrogen with a molar hydrogen-hydrocarbon ratio of from 0.5:1 to 2.5:1 with a catalyst consisting essentially of nickel on a nickel-alumina base, said catalyst having from 1 to 50% wt. of nickel in the catalyst base and from 1 to 30% wt. of nickel deposited on the base and having been prepared by impregnating alumina with a solution of a nickel compound decomposable under heat to nickel oxide, calcining the impregnated alumina at a temperature above 650° C. but not in excess of 1000° C., and by impregnating the base so formed with a further solution of a nickel compound decomposable under heat to nickel oxide and calcining at a temperature in the range 350° to 650° C., and recombining the treated higher-boiling fraction with the lower-boiling fraction, said recombined product having a volatility of at least 40% vol. recovered at 100° C., and an octane number research (clear) of at least 90.

2. A process as claimed in claim 1, wherein the cut-point between the higher-boiling and lower-boiling fractions is from 100–120° C.

3. A process as claimed in claim 1, wherein the catalyst of nickel on a nickel-alumina base has from 25 to 40% wt. of nickel in the catalyst base and from 10 to 20% wt. of nickel deposited on the base.

4. A process as claimed in claim 1, wherein the recombined blend has a volatility of from 40 to 60% vol.

5. A process as claimed in claim 1 wherein the calcined nickel-alumina base is extracted with an inorganic acid prior to impregnation with the further solution of a nickel compound.

References Cited in the file of this patent

UNITED STATES PATENTS

| 2,361,138 | Voorhies | Oct. 24, 1944 |
| 2,383,072 | Oblad | Aug. 21, 1945 |
| 2,758,062 | Arundale et al. | Aug. 7, 1956 |
| 2,889,263 | Hemminger et al. | June 2, 1959 |

FOREIGN PATENTS

| 675,914 | Great Britain | July 16, 1952 |

UNITED STATES PATENT OFFICE
CERTIFICATE OF CORRECTION

Patent No. 3,071,537            January 1, 1963

Frederick William Bertram Porter et al.

It is hereby certified that error appears in the above numbered patent requiring correction and that the said Letters Patent should read as corrected below.

Column 2, line 2, for "alkly benzenes" read -- alkyl benzenes --; lines 26 and 27, for "preferred quantity" read -- preferred further quantity --; line 32, after "with" insert -- the --.

Signed and sealed this 5th day of November 1963.

(SEAL)
Attest:

ERNEST W. SWIDER
Attesting Officer

EDWIN L. REYNOLDS

Acting Commissioner of Patents